(12) United States Patent
Lawyer et al.

(10) Patent No.: US 8,538,992 B1
(45) Date of Patent: Sep. 17, 2013

(54) METHODS, SYSTEMS, AND DATA STRUCTURES FOR FEDERATING ELECTRONIC CALENDARS

(75) Inventors: Daniel C. Lawyer, Pleasant Grove, UT (US); Jeffrey Todd Hawkins, Mapleton, UT (US); Scott Alan Isaacson, Woodland Hills, UT (US); Matthew Richard French, Pleasant Grove, UT (US); James D. Nyland, Pleasant Grove, UT (US); Stephen R Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 893 days.

(21) Appl. No.: 10/612,059

(22) Filed: Jun. 30, 2003

(51) Int. Cl.
*G06F 17/30* (2006.01)

(52) U.S. Cl.
USPC ........... 707/790; 707/797; 707/802; 707/809; 707/951

(58) Field of Classification Search
USPC ................ 709/203, 206, 208, 216; 707/1, 707/201; 705/9; 715/530, 823
See application file for complete search history.

(56) References Cited

U.S. PATENT DOCUMENTS

| | | | | |
|---|---|---|---|---|
| 5,327,555 A * | 7/1994 | Anderson | ..................... | 707/201 |
| 5,899,979 A | 5/1999 | Miller et al. | ...................... | 705/9 |
| 6,085,166 A * | 7/2000 | Beckhardt et al. | ................ | 705/9 |
| 6,212,529 B1 * | 4/2001 | Boothby et al. | .............. | 707/201 |
| 6,304,892 B1 | 10/2001 | Bhoj et al. | ..................... | 709/202 |
| 6,738,975 B1 * | 5/2004 | Yee et al. | ...................... | 719/310 |
| 6,785,868 B1 * | 8/2004 | Raff | .............. | 715/530 |
| 6,823,357 B1 * | 11/2004 | Du et al. | ...................... | 709/203 |
| 6,879,997 B1 * | 4/2005 | Ketola et al. | ................... | 709/208 |
| 2003/0036941 A1 * | 2/2003 | Leska et al. | ....................... | 705/9 |
| 2003/0065742 A1 * | 4/2003 | Culp et al. | .................... | 709/218 |
| 2003/0095149 A1 * | 5/2003 | Fredriksson et al. | ......... | 345/797 |
| 2004/0044646 A1 * | 3/2004 | Hullot et al. | ...................... | 707/1 |
| 2004/0073615 A1 * | 4/2004 | Darling | ........................ | 709/206 |
| 2005/0039142 A1 * | 2/2005 | Jalon et al. | .................... | 715/823 |

OTHER PUBLICATIONS http://www.apple.com/ical/.
http://www.brownbearsw.com/ical/icalpage.html.

\* cited by examiner

*Primary Examiner* — Christyann Pulliam
*Assistant Examiner* — Charles Adams
(74) *Attorney, Agent, or Firm* — Schwegman, Lundberg & Woessner, P.A.

(57) ABSTRACT

The methods, systems, and data structures are taught for federating disparate calendaring systems into composite calendaring systems and composite calendars. First and second calendaring systems are bridged to a composite calendaring system using a bridging communication. The composite calendaring system tracks and presents selective information within a composite calendar.

12 Claims, 4 Drawing Sheets

METHODS, SYSTEMS, AND DATA STRUCTURES FOR FEDERATING ELECTRONIC CALENDARS

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in any drawings hereto: Copyright © 2003, Novell, Inc., All Rights Reserved.

FIELD OF THE INVENTION

The invention relates to techniques for federating electronic calendars. More specifically, the invention relates to federating a plurality of selective information associated acquired from disparate electronic calendaring systems into composite calendaring systems and composite calendars.

BACKGROUND OF THE INVENTION

Individuals are becoming increasingly dependent on electronic calendaring systems to keep up with their fast paced lives. This dependency has become more prominent in recent years with the advent of personal digital assistants (PDAs). In fact, the primary use of a PDA appears to be for purposes of staying in synch with one's calendar of events.

However, as society becomes increasingly mobile and dependent on electronic communications, calendaring systems have only marginally changed to accommodate trends and needs. For instance, a conventional calendaring system does not collaborate with different calendaring systems. As a result, an individual that needs to track and integrate with a variety of disparate calendaring systems is out of luck. But, individuals often have a variety of calendars that they maintain, such as work calendars, social calendars, religious calendars, association calendars, each of which may be associated with a different calendaring system.

Moreover, there is not just a need for one individual to integrate with his/her own calendaring systems, because in many circumstances there is a need to collaborate with calendaring systems of different individuals (e.g., husband with his wife or vice versa).

There have been some advancements in integrating electronic mail systems, but little attempt has been made to improve the integration of disparate calendaring systems. In fact, the trend has been to force individuals to use a generic calendaring system of the same type, if collaboration or integration is desired (e.g., a centralized World Wide Web (WWW) browser-based calendaring system). Yet with this technique, individuals are forced to adapt to yet another calendaring system, and this does not address the real issue of integrating disparate calendaring systems, which is often the practical reality that individuals are faced with today.

Thus, improved techniques for federating (collaborating and integrating) electronic calendaring systems into a composite calendaring system are needed.

SUMMARY OF THE INVENTION

In various embodiments of the invention, disparate calendaring systems are federated into a composite calendaring system. Disparate first and second calendars are selectively identified and a bridging communication established between the calendars. A composite calendaring system permits selective information from the first and second calendaring systems to be viewed within a composite calendar of a composite calendaring system.

More specifically, and in one embodiment of the invention, a method to federate calendaring systems is described. First and second calendaring systems are identified. The first and second calendaring systems are disparate from one another. Moreover, a bridging communication is established between the first and second calendaring systems. Next, a composite calendaring system is presented that uses the bridging communication to coordinate selective information from the first and second calendaring systems.

In another embodiment of the invention, a method that provides a composite calendar associated with disparate calendaring systems is taught. First and second calendaring systems are selected, each system having first and second schemas, respectively. Further, the first and second calendaring systems are disparate from one another. Additionally, a meta schema is used for selectively synchronizing events of the first and second calendaring systems into the composite calendar.

In still another embodiment of the invention, a composite calendaring system is presented. The composite calendaring system includes a data structure and an application programming interface (API). The data structure is for synchronizing first and second calendaring systems, which are disparate from one another. The API is for defining a composite calendar having selective information compiled from the first and second calendaring systems.

In yet another embodiment of the invention a composite calendar data structure, residing in a computer-accessible medium, is described for synchronizing external calendars. The composite calendar data structure includes a first calendar entry acquired from a first calendar, a second calendar entry acquired from a second calendar, and a composite calendar entry representing selective information from the first and second calendar entries. The first and second calendar entries are acquired from first and second calendaring systems, which are disparate from one another.

DETAILED DESCRIPTION OF THE INVENTION

Figure 1:
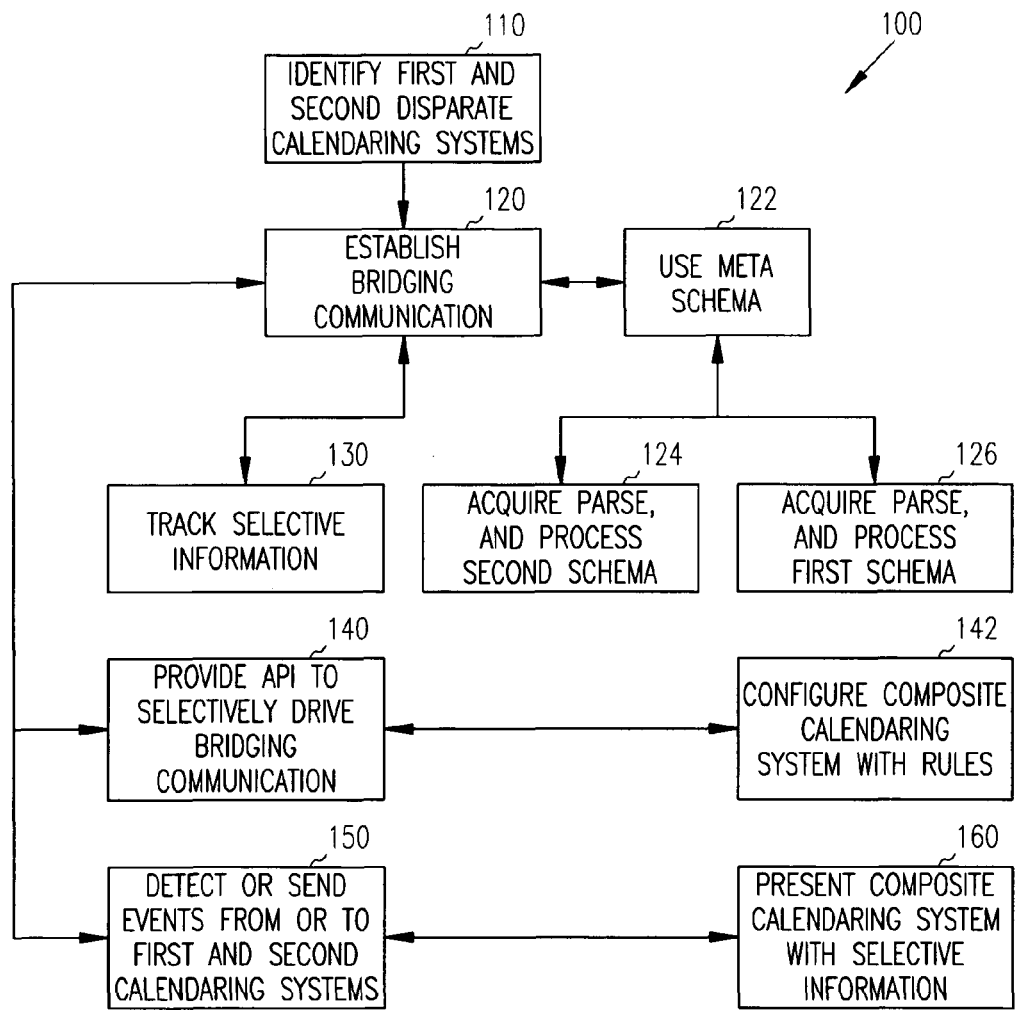
FIG. 1 is a flowchart representing a method for federating calendaring systems, according to one embodiment of the invention.

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the invention. The following description is, therefore, not to be taken in a limited sense, and the scope of the invention is defined exclusively by the appended claims.

In various embodiments of the invention, the phrase "calendaring system" is used. A calendaring system can include existing commercially developed software calendar products (e.g., GroupWise, iCalendar, Lotus, Exchange, Outlook, and others) or software calendar products hereafter developed. Disparate calendaring systems are calendar products that are not compatible (different from) with one another. The composite calendaring systems, described below with various embodiments of the invention, can be modified existing calendar products or stand alone developed calendar products. Furthermore, the composite calendaring systems of the invention can be integrated into other software products or services.

A meta schema is a data definition that bridges two or more disparate schemas. Each disparate schema belongs to a separate calendaring system. Conventionally, calendaring systems include schema definitions that are internally used with each calendaring system in order to properly process calendar data. A meta schema includes definitions and logic for properly parsing and processing each of the disparate schemas into new data formats and Application Programming Interface (API) calls, which are consumed in composite calendaring systems of the invention. Moreover, variable values and parameter data can be passed to or expanded by tools processing schemas in order to permit dynamic data substitution within the schemas.

In additional CAP standards can be used with the bridging communication of this invention for purposes of providing a number of standard API calls for communications between disparate calendaring systems.

Schema definitions are readily known, available, and used by one of ordinary skill in art of this invention. Moreover, A variety of programming languages and tools exist to develop and process schemas (e.g., Extensible Markup Language (XML) and Extensible Style Sheets Transformation Applications (XMLT)). Any such schema definition, language, or tool can be used with the embodiments of the invention.

One embodiment of this invention is implemented using the GroupWise, NetMail and Portal Service products distributed by Novell, Inc., of Provo, Utah. Of course, the invention can be implemented in a variety of platforms, systems, modules, services, and products. Additional, communication standards can be used, for example, Calendar Access Protocol (CAP) standards can be used for bridging various communications between disparate calendaring systems for embodiments of this invention. All such platforms, systems, modules, services, and products, which are modified and used to achieve the tenets of the invention, are intended to fall within the scope of the invention.

Furthermore, although embodiments of this invention are discussed in terms of first and second disparate calendaring system, the invention is not so limited, since a plurality of disparate and non-disparate calendaring systems can benefit from the teachings of the invention, where at least two of the plurality of disparate calendaring systems is disparate from one another.

FIG. 1 is a flowchart representing one method 100 for federating calendaring systems, the method 100 is implemented as an electronic calendaring system, which can be a stand alone system or a system integrated into other calendar independent systems. Furthermore, the calendaring system can be implemented in an electronic network environment or a non networked environment.

At 110, a Graphical User Interface (GUI) application is interfaced to the method 100 processing. The GUI permits selection and identification of a first calendaring system and a second calendaring system. Each of the calendaring systems is disparate from one another. Of course any application can be interfaced to method 100 for selecting the first and second calendaring systems. For instance, an API application can directly interface with method 100 in order to initially identify the first and second calendaring systems. Thus, manual interactions with a GUI application or automatic processing of API application can be used to supply the identity of the first and second calendaring systems.

Once the identities of the first and second calendaring systems are determined, the types of the calendaring systems can be readily determined. A type uniquely identifies a specific calendaring system (e.g., GroupWise, iCalendar, Lotus, Exchange, Outlook, and others). For example, each calendaring system can be uniquely identified in a data file or data structure that is accessible to the processing of the method 100, where a lookup in the data file produces other information related to the appropriate unique type for each of the calendaring systems. When the calendaring system types are known an appropriate bridging communication is established at 120.

A bridging communication is an application or data definition that translates the API calls and data formats expected by the first and second calendaring systems into data formats and API calls used by the processing of the method 100. In some embodiments, the bridging communications is a predefined application for translating communications between the processing of the method 100 and the first and second calendaring systems. In other embodiments, the bridging communication is a meta schema that uses existing or custom-developed schema parsing and processing tools to translate communications between the processing of the method 100 and the first and second calendaring systems.

In one embodiment, at 122 after the types of the first and second calendaring systems are known, a proper meta schema needed for translation or proper parameters needed for processing a generic meta schema can be determined. The meta schema is used in connection with first and second schemas that define data and communication formats expected by the first and second calendaring systems, respectively. Accordingly, at 124 and 126, the first and second schemas are acquired, parsed, and processed.

At 130, selective information from the first and second calendaring systems is tracked, once the appropriate bridging communication is established. Selective information can be events occurring within the first and second calendaring systems, and are selectively configured as tracking events within in the bridging communication. Moreover, some of the tracked events can be predefined within the bridging communication.

The bridging communication can be driven by an API that interfaces with the processing of the method 100. According, at 140, an API is provided having a variety of methods or routines that can effect changes and direct the bridging communication to take some action. Example actions can include defining events to track in one or both of the first and second calendaring systems. Moreover, events within the processing of the method 100 can be defined and used to take other actions.

For example, when a defined calendar entry associated with the processing of method 100 is changed, an action can be defined within the API to send the corresponding change to the first or second calendaring system. A variety of events and actions can be defined using the API. Calendaring events and actions are well known to one of ordinary skill in the art and can include such things as defining a meeting having specific attendees, dates, and times of day; defining access priorities to calendar entries; defining recurring meetings; defining reminders; defining alert notifications; defining modifications to existing calendar entries; defining calendar entries for deletion; and others.

Generally, events define conditions that occur during the processing of a calendaring system. Events can be predefined (globally accessible) within the logic of the calendaring system or, in many circumstances; events can be custom defined using an API of the native calendaring system. Thus, in various embodiments of the invention, external events are defined within the processing of the method 100 via the provided API for any calendaring system embodied as the processing of the method 100. Predefined external events are automatically available automatically through the bridging communication via the provided API. To the extent that the first and second calendaring entries permit custom-developed event definition, the bridging communication can be used in concert with the provided API to define such external events associated with the first and second calendaring entries. Detection of external events drive the processing of actions.

Actions can raise events, but do not need always need to raise events. For example, an action can be defined to make a notation in a calendaring tracking log. In this situation, it may not be desirable to detect that this processing has taken place, or event that it successfully happened, thus there may be no need to raise an event. However, in most circumstances, the processing of an action will raise an event, such as adding a calendaring entry to the first or second calendaring systems or to a composite calendar synchronized within the processing of the method 100. An action is processing logic definable within the processing logic of a calendaring system, whereas an event is a result of processing an action. Events and actions are readily understood and known to one of ordinary skill in the art of this invention.

The provided API can also be used to configure a composite calendaring system defined by the processing of the method 100, as depicted at 142. Thus, custom views, custom actions, and custom preferences for the composite calendaring system can be easily configured via the provided API.

At 150, a composite calendar is operational within the composite calendaring system, such that external events from the first and second calendaring systems are detected and tracked via the bridging communication. Additionally, in some embodiments, events native to the composite calendaring system can be detected and raised to the first and second calendaring systems via the bridging communication.

Once the composite calendar is operational, at 160, a composite calendaring system is completely presentable where selective information from the first and second calendaring systems is tracked and presented within the composite calendar. Additionally, some information being modified with the composite calendar can be optionally communicated back to the first or second calendaring systems via the bridging communication.

The first, second, and composite calendaring systems do not need to be owned by the same entity (user). In other words, a user may want to track and coordinate his composite calendar with that of other individuals who have their own calendars in the first or second calendaring systems. Of course, in these situations, the owner of the composite calendar needs at least view access rights to the calendars of the other individuals.

For purposes of illustration, an example application of a composite calendaring system embodied by the processing of the method 100 is presented. Consider a fictional person named Bob. Bob is a life insurance sales representative. As part of Bob's work responsibilities he frequently participates in project teams to assist the organization. Some of Bob's participation of project teams is voluntary, at other times Bob's participation is mandatory.

In Bob's spare time, he enjoys watching sporting events, participating regularly in his local church activities, and attempting to attend all the activities associated with his children. He tries desperately to keep track of everything in his organizer, which he synchronizes with his calendar at work but inevitably he misses some meetings, events, and activities because of regular conflicts. In an attempt to organize his life more efficiently, Bob thinks about all of the different calendars that his is trying to monitor, and he creates the following list:

Work:
Corporate Events Calendar
Regional Sales Calendar
District Sales Calendar
Project Team Calendars
Personal Calendar
Family:
Elementary Calendar
Junior High School Calendar
Daughter's Soccer Calendar
Church:
Local Congregation Calendar
Church Youth Activities Calendar
Regional Multi-Congregation Calendar
Sporting Events:
Football Calendar
Baseball Calendar
Jazz Calendar As Bob is thinking about this over abundance of calendars, he discovers a feature of his GroupWise electronic calendaring system, represented by the processing the method 100, called composite calendaring. Bob accesses the composite calendaring system and selects or subscribes to each of his disparate electronic calendaring systems. Several of Bob's existing calendaring systems are disparate from his GroupWise calendaring system. For instance, at home Bob uses a Lotus calendaring system.

Bob access a number of GUI windows on his electronic organizer and readily defines the types of calendaring entries, events, and actions that he desires to be tracked in his newly discovered composite calendaring feature. Now, Bob can see at a glance all of the events in his busy life and best of all, all of the changes and additions to these disparate calendars automatically display in Bob's composite calendar. Bob decides all of his work and family calendar events automatically become part of his individual calendar. He chooses not to have the sports or church events in his permanent calendar, but he still displays these excluded events as an FYI in his composite calendar, so that he can attend when feasible.

As Bob access the composite calendaring features he discovers that he can add events from other composite calendars associated with other individuals. Moreover, Bob can publish his composite calendar to other composite calendars of different individuals or to his individual work calendar, if desired.

One of ordinary skill in the art of this invention now fully understands the benefits of federating disparate calendaring systems into a composite calendaring system. The composite calendaring system of this invention improves time management over conventional techniques, since now an individual can synchronize a plurality of calendars with a single composite calendar.

Furthermore, in various embodiments of the invention, the composite calendaring system can be used to create hierarchical calendars. For example, entries within one composite calendar can uniquely and visually be displayed within the composite calendar, such that font sizes, font types, font effects, images, and the like permit ready assimilation as to the origin of the individual entries. Some composite calendar entries can be associated with other composite calendars, which are associated with other individuals. These other composite entries can be expanded to show the calendars from which they originate. Furthermore, in some embodiments, different configurable views within the composite calendaring system can permit embedded composite calendars to be viewed as a hierarchy or tree, because embedded composite calendar entries can also include other embedded composite calendar entries. Thus, composite calendars can inherit entries from other composite calendars to create a hierarchy of composite calendars.

Figure 2:
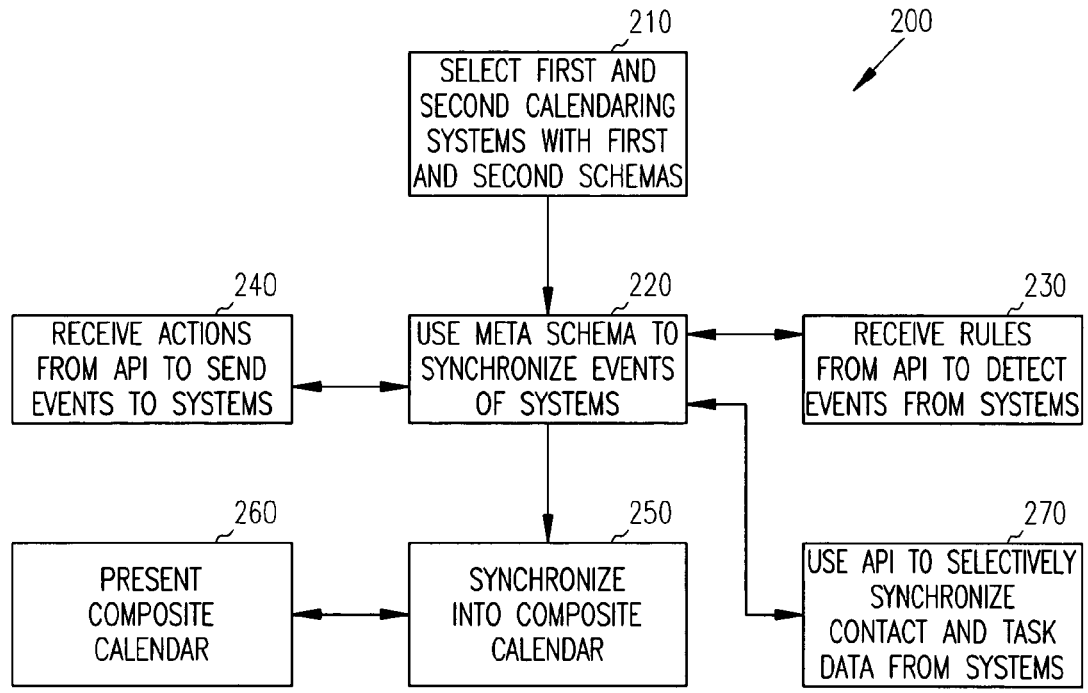
FIG. 2 is a flowchart representing a method for providing a composite calendar, according to one embodiment of the invention.

FIG. 2 is a flowchart representing one method 200 for providing a composite calendar. The composite calendar is provided by a composite calendaring system represented by the processing of method 100 described above with FIG. 1. The processing of method 200 is implemented in a computer accessible medium as software processing instructions. Moreover, the processing can be embodied within a stand alone composite calendaring system or embedded within an existing calendaring system as a composite calendaring feature.

Calendars can be of three kinds: a calendar owned by an external agent (e.g., owned by a different individual or application for a group or organization), a calendar owned by a single entity that has write access privileges, and calendars owned by a separate entity by giving write access privileges to other entities (e.g., one spouse's calendar with write privileges granted to the other spouse).

Each of the calendar types can be represented in disparate calendaring systems (e.g., one calendar in a GroupWise calendaring system, one calendar in a Lotus calendaring system, and one calendar in an Exchange calendaring system). Although, for purposes of this invention (as was described above in detail with FIG. 1) a single calendar type can also be depicted in a plurality of disparate calendaring systems as disparate calendars.

In order to access disparate calendars from disparate calendaring systems, the data and communication formats of the disparate calendaring systems are predefined in a unique schema for each calendaring system type. Once this has been achieved, a meta schema can be defined that bridges communication between disparate calendaring systems. In this way, the meta schema or bridging communication federates the disparate calendaring systems into a format that can be consumed and synchronized by composite calendaring systems of the invention.

In one embodiment, a single meta schema can be used to federate between three or more disparate calendaring systems, where the types of each disparate calendaring system are passed as parameters to any parsing and processing application utilizing the single meta schema. In other embodiments, a plurality of meta schemas can be developed and cooperate with one another, where each meta schema performs a translation from a single disparate calendaring system to another disparate calendaring systems. The plurality of meta schemas are then interfaced via an application of the composite calendaring system.

At 210, at least a first and second calendaring system is selected for federation into a composite calendar managed by a composite calendaring system. The first and second calendaring systems are disparate in type from one another. Selection can be achieved automatically via an API, such as when a batch application or automatic application is being used. Alternatively, selection can be achieved via a GUI application that manually interacts with a user and an API. The API communicates with the meta schema or other applications processing the meta schema, which establish a bridging communication between the first and second calendaring systems and the composite calendaring system.

At 220, the meta schema (or bridging communication) is used for synchronizing events occurring in the first and second calendaring systems with the composite calendaring system. Additionally, in some embodiments, the meta schema is used for synchronizing events from the composite calendaring system back to at least one of the first and second calendaring systems.

In one embodiment, at 230, rules are received via an API. The rules define events or actions that are to be detected or taken with the first and second calendaring system when assembling the composite calendar. For example, a rule can be defined through the API to detect when a calendar entry or modification is made in first or second calendars of the first or second calendaring systems, respectively. The rule can also define an action to automatically add the external entry to the composite calendar. Alternatively, the rule can send only an alert notification to the composite calendaring system for pop-up display within a GUI application of the composite calendaring system.

Rules can also be used to define preferences or configurations of the composite calendar and to speed processing of the composite calendar. For example, if an Appointment X conflicts with an Appointment Y and X originates from a higher priority calendar, then automatically accept X in the composite calendar and decline Y back to the external calendar.

Rules can also be more complex, such as if X is in conflict with Y and X has already been accepted in the composite calendar, then accept Y if X is subsequently cancelled. Rules can also set global priorities, such as X is work calendar appointment and is therefore a top priority whereas Y is a hobby calendar appointment and is therefore a low priority.

Rules can also be used to create permanent entries in the composite calendar or tentative entries in the composite calendar. Moreover, rules can require some manual interaction with or notification from the owning entity of the composite calendar. Additionally, a rule can give feedback or send automatic updates to the first and second calendaring systems based on access rights associated with the first and second calendaring systems.

In still other embodiments, at 240, actions (defined by the rules) can be received for processing, which require the composite calendaring system to send events to at least one of the first or second calendaring system. Accordingly, when composite calendaring entries are modified an action can be processed, which requires the bridging communication to use the meta schema in order to translate the changed entry into an external event that is recognized by at least one of the first and second calendaring systems. Thus, not only can the composite calendar be synchronized to first and second calendars, but the composite calendaring systems can also be used to synchronize the first and second calendars with the composite calendar.

Moreover, in some embodiments, rules and actions can be used to synchronize other composite calendars with a single composite calendar, as was described above with FIG. 1.

Correspondingly, composite calendars can inherit children calendar entries of other composite calendars. In this way, a composite calendar can be viewed as a hierarchy of other calendars.

It should also be noted that the composite calendaring system can synchronize more than two disparate calendaring systems, and that some of the additional (greater than two) calendaring systems may not be disparate from one of the at least two disparate calendaring systems. Thus, the composite calendaring system can synchronize a first and second calendaring system associated with calendar types of GroupWise and Lotus, respectively, and the composite calendaring system can also synchronize a third calendaring system associated with a calendar type of Exchange.

At 250, the rules and actions of the composite calendaring system are used to synchronize the composite calendar with the first and second calendars of the first and second calendaring systems, respectively. Optionally, the rules and actions of the composite calendaring system are also used to synchronize at least one of the first and second calendars with the composite calendar. At 260, the composite calendaring system presents the assembled composite calendar.

In one embodiment, an API can be used in connection with establishing the rules and actions to also synchronize other related calendar data, as depicted at 270. For example, often calendaring systems include task or contact data, which is accessible to and integrated with the calendaring systems. In these circumstances, the API can be used to synchronize and integrate the external contact or task data as composite contact or task data, respectively. Thus, all related calendar data accessible and definable via the meta schema can be synchronized between the composite calendaring system and external calendaring systems.

Figure 3:
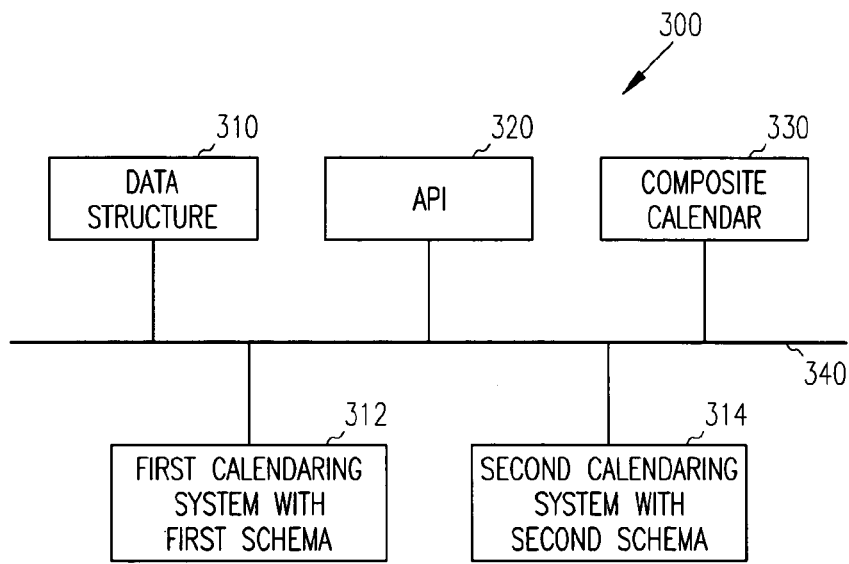
FIG. 3 is a diagram of a composite calendaring system, according to one embodiment of the invention.

FIG. 3 is a diagram of one composite calendaring system 300 having a data structure 310 and an API 320. The composite calendaring system 300 is implemented in one or more software applications within a computer accessible medium. Thus, the composite calendaring system 300 can be a stand alone and an independent calendaring system 300 or a calendaring system 300 that is modified to provide composite calendaring.

The data structure 310 provides a synchronization technique for disparate first 312 and second 314 calendaring systems. In some embodiments, the data structure 310 is constructed as a meta schema 310 that bridges native data formats and API calls of the first 312 and second 314 calendaring systems into a normalized format for use within the composite calendaring system 300. In other embodiments, the data structure 310 is an executable software application 310 that bridges and normalizes data formats and API calls among the first 312 and second 314 calendaring systems and the composite calendaring system 300.

The API 320 provides interface applications between the composite calendaring system 300 and the data structure 310. Some lower level applications of the API 320 also make external calls to native APIs of the first 312 and second 314 calendaring systems. Thus, the API 320 serves to further bridge communications between the composite calendaring system 300 and the first 312 and second 314 calendaring systems.

API 320 applications is also interfaced to other higher-level applications, such as a GUI application providing an owning entity with access to the composite calendaring system 300. By interacting with the GUI application, the appropriate API 320 applications are processed within the composite calendaring system 300.

The API 320 is used for initially subscribing or selecting the first 312 and second 314 calendaring systems, which are desired to be synchronized within a composite calendar 330 being maintained within the composite calendaring system 300. Moreover, the API 320 is used for defining rules and actions, which are used for tracking and synchronizing selective information for the first 312 and second 314 calendaring systems. Selective information can be any calendar-related data, such as appointment information, notification information, contact information, task information, and the like.

When rules are processed from the API 320, the selective information is acquired from the first 312 and second 314 calendaring systems. Moreover, when actions are processed from the API 320, changes can be made in information maintained within the first 312 or second 314 calendaring systems.

In some embodiments, the API 320 also includes presenting applications that visually or audibly communicate the composite calendar 330 via the composite calendaring system 300. Presentation can be made with visual cues such as text fonts, font sizes, font effects, images, animation, or video.

Presentation can also permit audible communication, such as when the composite calendar 330 is represented in a data format (XML), which can be interfaced to an external text-to-voice application. In these situations a user can obtain information regarding his/her composite calendar 330 by dialing into a service hosting the test-to-voice application. Furthermore, in situations where the text-to-voice application also includes voice-to-text capabilities, a user can issue commands to modify his/her composite calendar.

One of ordinary skill in the art of this invention now fully appreciates how a composite calendaring system 300 is implemented to federate external calendars from disparate external calendaring systems. The system 300 provides better time management integration than has been conventionally available, since conventional calendaring systems do not collaborate or integrate with other disparate calendaring systems. Additionally, the composite calendaring system 300 communicates with the external calendaring systems via any traditional network 340. As a result, without the teachings of this invention, users attempt to maintain several calendars, and require multiple manual interactions with each of the calendars to stay in synch with their calendars whenever and wherever they may desire.

Figure 4:
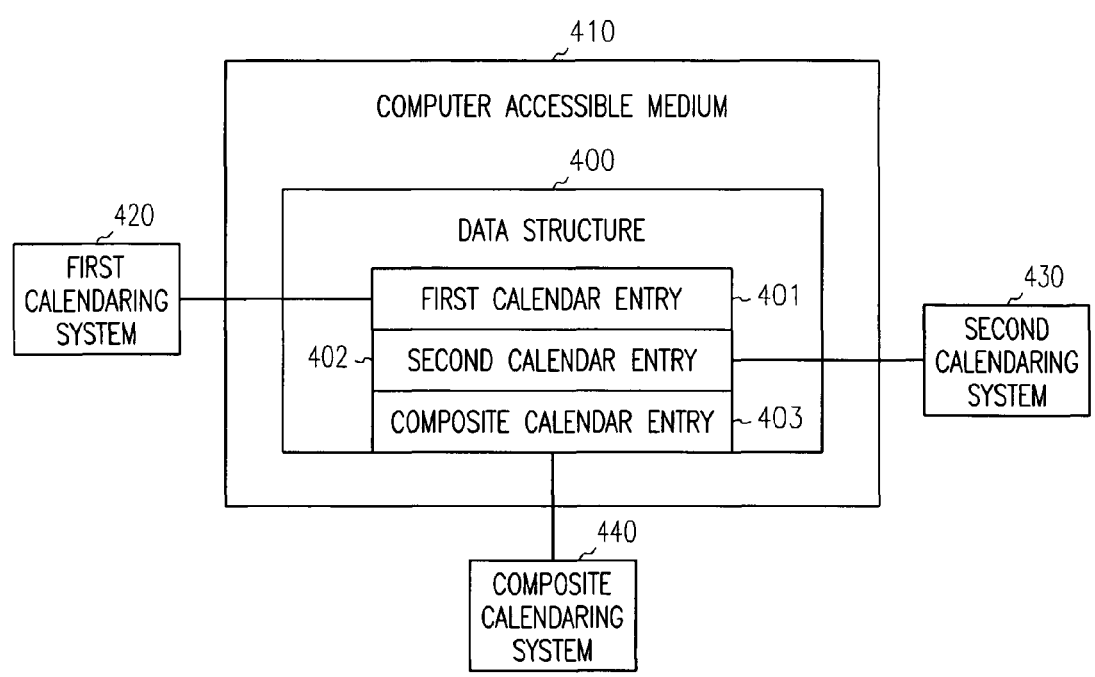
FIG. 4 is a diagram of a composite calendar data structure, according to one embodiment of the invention.

FIG. 4 is a diagram of one composite calendar data structure 400, residing in a computer-accessible medium 410. The data structure 400 is dynamically modifiable and can be logically assembled from a plurality of storage or memory locations. Thus, the data structure 400 need not reside contiguously within storage or memory locations, and some locations can be remote from one another. The data structure 400 is used for synchronizing at least two disparate external calendars. The data structure 400 can also be used for synchronizing external calendars of the same type, where a third external calendar is being synchronized.

The data structure 400 includes first 401, second 402, and composite calendar entries 403. The first 401 and second 402 calendar entries are associated with selective information acquired from first 420 and second 430 calendaring systems, respectively. The selective information can be associated with first and second calendars or calendar-related data. In one embodiment, an API is provided for defining the type of information needed to assemble the selective information correctly from the first 420 and second 430 calendaring systems.

In one embodiment, the data structure 400 can also includes rules, actions, profiles, and other configuration data desired by the composite calendaring system 440. If the other information is present within the data structure 400, then the data structure 400 can be an executing application 400, although this is not required by the invention. Moreover, in some embodiments, the data structure 400 can be a meta schema 400, which bridges communications between the first 420 and second 430 calendaring systems by translating first and second schemas, respective.

The composite calendaring system 440 uses the data structure 400, and optionally other applications, for dynamically constructing the composite calendaring entry 403, which represents a federated composite calendar.

In some embodiments where the data structure 400 is not represented as a meta schema, the composite calendaring system 440 uses a meta schema or a different bridging communication technique (application) for dynamically acquiring the first 401 and second 402 calendar entries. Once the selective information from these entries are obtained, the composite calendaring system 440 may or may not modify some of that information before constructing the composite calendar entry 403.

The composite calendaring system 440 detects when changes occur in external information associated with the selective information by monitoring events occurring in the first 420 and second 430 calendaring systems. When a change is detected, the composite calendaring system 440 can automatically and dynamically update the composite calendar entry 403. In other embodiments, when a change is detected, the composite calendaring system 440 issues an alert notification for manually confirmation or intervention before updating the composite calendar entry 403. In still other embodiments, the composite calendaring system 440 detects when changes are made in the composite calendar entry 403 and sends events to at least one of the first 420 and second 430 calendaring systems, where the first 420 and second 430 calendaring systems can elect to automatically update their external information associated with the change or provide an alert notification of the same.

One of ordinary skill in the art of this invention now comprehends how a composite calendar data structure 400 can be used within a computer-accessible medium to present a composite calendar within a composite calendaring system 440. The composite calendaring system 440 can be as described and depicted in FIG. 3 above. With such a composite calendar data structure 400, individuals can now collaborate and integrate a plurality of calendars where at least two of the calendars originate from disparate calendaring systems.

Figure 5:
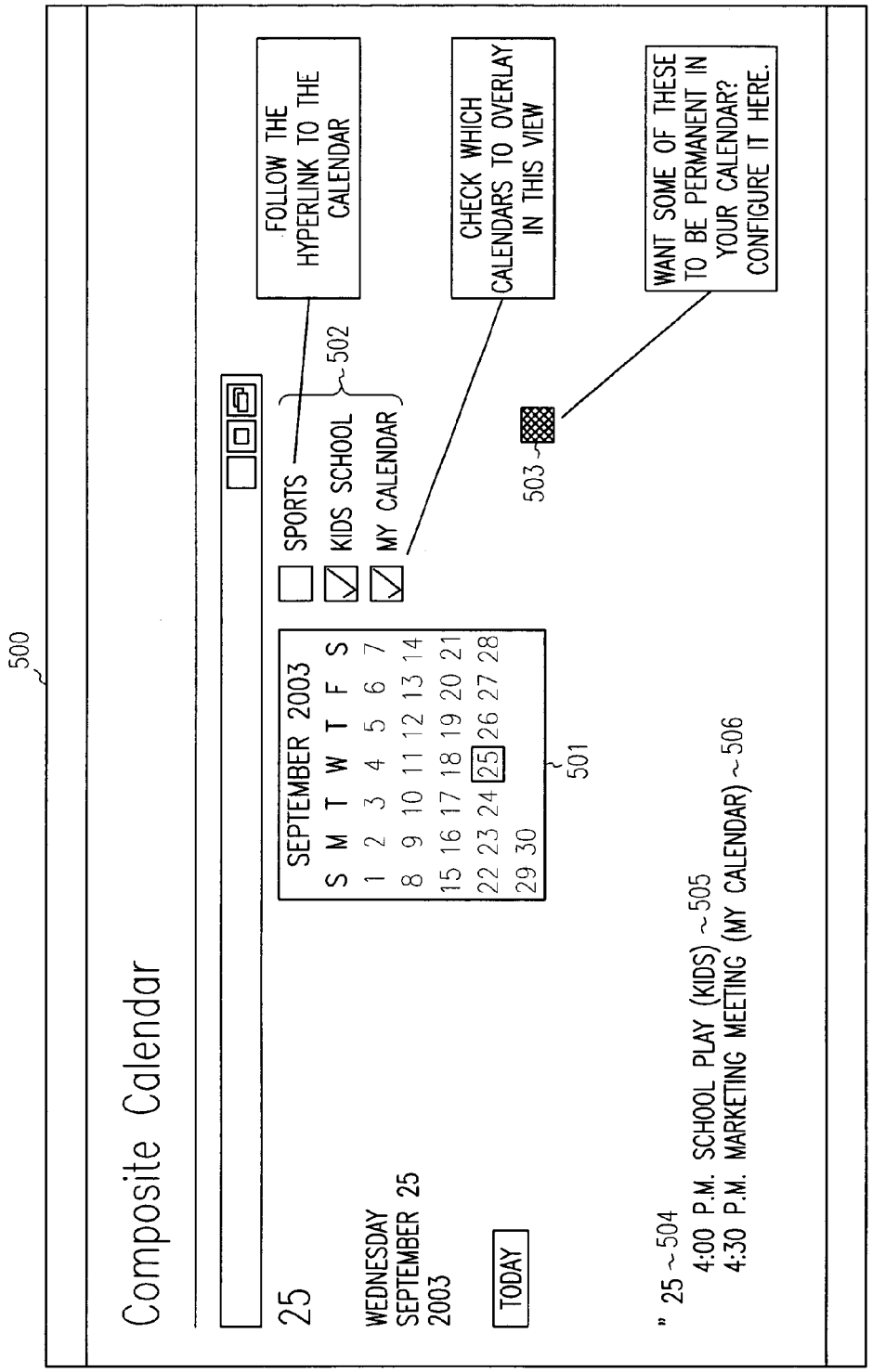
FIG. 5 is an example Graphical User Interface (GUI) screen shot for a composite calendaring system, according to one embodiment of the invention.

FIG. 5 is an example Graphical User Interface (GUI) screen shot 500 for a composite calendaring system. The screen shot is presented for purposes of illustration only, and is not intended to limit this invention. Moreover, the screen shot 500 depicts only a single view for one state of a processing composite calendaring system. The composite calendaring system can be one as depicted in FIG. 3.

One or more GUI applications generate and provide the screen shot 500, which represents an example view for an example processing state of the composite calendaring system. As is readily recognized, the screen shot 500 shows a view 501 depicted an entire month of a user. Various external calendar entries associated with at least two disparate calendaring systems are viewed by selecting the menu options 502.

In the screen shot 500 two external calendar entries "Kids School" and "My Calendar" are actively selected. These entries are associated with external calendars of external calendaring systems that are disparate from one another. The actual depiction of the entries, if present, will appear when the user selects a specific calendar date from the viewable calendar days 501. This selection will generate another screen shot (not depicted) and processing state of the composite calendaring system.

The composite calendaring system can include a variety of other useful features, such as the ability to select (by clicking on the text language) a specific external calendar from menu 502. Such an action can automatically launch the selected external calendar for viewing. Thus, the composite calendaring system can access, in some circumstances, the native processing applications for the external calendaring systems.

Of course this presupposes that the external calendaring system can be launched from the computing environment of the composite calendaring system (such as when the external calendaring systems are web browser enabled). However, the external calendaring systems do not need to be launched from the composite calendaring system for the teachings of this invention, since interactions that synchronize the composite calendar can be achieved using the bridging communications described in detail above. Thus, this invention only needs to monitor and track events in the external calendaring systems, such interaction does not require that the native external calendaring system be processing and accessible within the computing environment of the composite calendaring system.

A variety of other options can also be available via applications accessible from the screen shot 500. For example, image icon 503 can be a link to other screen shots and processing states of the composite calendaring system, which permits configuration and profile information to be user defined.

Furthermore, in the screenshot 500, the day of the month selected (25 of Sep. 2003) can be highlighted or distinguished within the viewable calendar days 501 and calendar entries 505 and 506 for that particular day displayed within screenshot 500. For example, the bottom left view of screen shot 500 depicts the number 25 (505) representing the selected day (Sep. 25, 2003) of the viewable calendar days 501. This particular view also shows two sample calendar entries 505 and 506. The text in parenthesis of calendar entries 505 and 506 provides easy visual depictions as to the origins (originating calendaring system) of each particular calendar entry 505 and 506. Thus calendar entry 505 shows an appointment originating from the kid's calendar for a school play occurring at 4:00 p.m. on the 25 of Sep. 2003. Simultaneously, calendar entry 506 is presented with calendar entry 505. Calendar entry 506 shows a marketing meeting originated from my calendar and occurring at 4:30 p.m. on the 25 of Sep. 2003

One of ordinary skill in this art appreciates that a variety of different and useful features or links can be provided in higher-level GUI applications of composite calendaring systems developed with the teachings of this invention. All such GUI applications and features are intended to be covered by this invention, and the screen shot 500 is presented for purposes of illustrating only a few of such applications and features.

Although specific embodiments have been illustrated and described herein, those of ordinary skill in the art will appreciate that any arrangement calculated to achieve the same purpose can be substituted for the specific embodiments shown. This disclosure is intended to cover all adaptations or variations of various embodiments of the invention. It is to be understood that the above description has been made in an illustrative fashion only. Combinations of the above embodiments, and other embodiments not specifically described herein will be apparent to one of ordinary skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. §1.72(b), which requires an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in single embodiments for the purpose of description. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. The following claims are hereby incorporated into the Detailed Description, with each claim standing on its own as a separate preferred embodiment.

What is claimed is:

1. A non-transitory computer-readable storage medium implemented method that processes on a computer as instructions and the instructions for federating calendaring systems, comprising:
    identifying, by the computer, first and second calendaring systems, the first and second calendaring systems are disparate from one another, and the first and second calendaring systems are each represented and defined by a different schema definition, the first calendar system and the second calendaring system are each a particular software calendar product, and the first calendar system is a different calendar product from that than a calendar product which is associated with the second calendar system, the first calendar system is not compatible with the second calendar system, wherein the first and the second calendaring systems are identified by a particular Application Programming Interface (API) interfaced to the method that automatically identifies the first and second calendaring systems for the method, wherein identities for the first and second calendaring systems identify a unique type for each calendaring system, and the unique types provide identification of a bridging communication;
    dynamically, by the computer, establishing the bridging communication between the first and second calendaring systems, wherein the bridging communication is defined by a meta schema that combines and integrates the different schema definitions of the first and second calendaring systems, and the meta schema includes definitions and logic for parsing and processing the different schema definitions into new data formats and Application Programming Interface (API) calls used by a composite calendaring system, wherein each different schema definition is used by one of the first or second calendar systems to process calendar data, variable values and parameter data defined in the meta schema for dynamic data substitution within the meta schema, and using calendar access protocol standards with the bridging communication;
    presenting, by the computer, the composite calendaring system that uses the bridging communication via the definitions and logic of the meta schema to dynamically coordinate selective information from the first and second calendaring systems and using the bridging communication to process the Application Programming Interface (API) calls and the data formats used by the composite calendaring system, wherein the composite calendaring system is a different calendaring system from the first calendaring system and the second calendaring system and represents a dynamic composite view of the first and second calendaring system kept in dynamic synchronization, the bridging communication is an application that executes on the computer for translating communications occurring with the first calendaring system and the second calendaring system, wherein native events to the composite calendaring system are detected and raised back to both the first and second calendaring systems via the bridging communication and the composite calendaring system, selected actions of the first and second calendaring system raise the native events when notations to a tracking log of at least one of the first or second calendaring system are being made, wherein the composite calendaring system is another software product, and the first calendar system, the second calendar system, and the composite calendar system execute on the computer as software; and
    publishing, by the computer, a composite calendar, represented in the composite calendaring system as the synchronization of a first calendar maintained in the first calendaring system and a second calendar maintained in the second calendaring system, the composite calendar published to other composite calendars for other individuals who are different from an individual that is associated with the composite calendar, the first calendar, and the second calendar, the composite calendar inheriting entries from the other composite calendars and creating a hierarchy of composite calendars within the composite calendar, wherein different configurable views within the composite calendaring system are viewed as a tree of inherited composite calendars, wherein inherited composite calendar entries include other inherited composite calendar entries for other inherited composite calendars.

2. The method of claim 1 further comprising, providing, by the computer, at least one of an application programming interface (API) and a protocol to drive the bridging communication.

3. The method of claim 2 wherein in providing the API, rules are provided for selectively configuring the composite calendaring system.

4. The method of claim 1 further comprising using, by the computer, the bridging communication to detect events in the first and second calendaring systems.

5. The method of claim 4 further comprising using, by the computer, the bridging communication to send selective events to the first or second calendaring systems.

6. The method of 1 wherein in presenting the composite calendaring system, visual cues provide distinctions between calendaring entries associated with the first and second calendaring systems.

7. A method implemented as instructions in a computer medium and the instructions embodied within a calendaring system as a composite calendar feature of that calendaring system that executes on a computer, the method, comprising:
    identifying, by the computer, first and second calendaring systems, the first and second calendaring systems are disparate from one another, and the first and second calendaring systems are each represented and defined by a different schema definition, the first calendar system and the second calendar system are each a particular software calendar product, and the first calendar system is a different calendar product than a calendar product which is associated with the second calendar system, the first calendar system is not compatible with the second calendar system, wherein the first and the second calendaring systems are identified by a particular Application Programming Interface (API) interfaced to the method that automatically identifies the first and second calendaring systems for the method, wherein identities for the first and second calendaring systems identify a unique type for each calendaring system, and the unique types provide identification of a bridging communication;

dynamically, by the computer, establishing the bridging communication between the first and second calendaring systems, wherein the bridging communication is defined by a meta schema that combines and integrates the different schema definitions of the first and second calendaring systems, and the meta schema includes definitions and logic for parsing and processing the different schema definitions into new data formats and Application Programming Interface (API) calls used by a composite calendaring system, wherein each different schema definition is used by one of the first or second calendar systems to process calendar data, variable values and parameter data defined in the meta schema for dynamic data substitution within the meta schema, and using calendar access protocol standards with the bridging communication;

presenting, by the computer, the composite calendaring system that uses the bridging communication via the definitions and logic of the meta schema to dynamically coordinate selective information from the first and second calendaring systems and using the bridging communication to process the Application Programming Interface (API) calls and the data formats used by the composite calendaring system, wherein the composite calendaring system is a different calendaring system from the first calendaring system and the second calendaring system and represents a dynamic composite view of the first and second calendaring system kept in dynamic synchronization, the bridging communication is an application that executes on the computer for translating communications occurring with the first calendaring system and the second calendaring system, wherein native events to the composite calendaring system are detected and raised back to both the first and second calendaring systems via the bridging communication and the composite calendaring system, selected actions of the first and second calendaring system raise the native events when notations to a tracking log of at least one of the first or second calendaring system are being made, wherein the composite calendaring system is another software product, and the first calendar system, the second calendar system, and the composite calendar system execute on the computer as software; and publishing, by the computer, a composite calendar, represented in the composite calendaring system as the synchronization of a first calendar maintained in the first calendaring system and a second calendar maintained in the second calendaring system, the composite calendar published to other composite calendars for other individuals who are different from an individual that is associated with the composite calendar, the first calendar, and the second calendar, the composite calendar inheriting entries from the other composite calendars and creating a hierarchy of composite calendars within the composite calendar, wherein different configurable views within the composite calendaring system are viewed as a tree of inherited composite calendars, wherein inherited composite calendar entries include other inherited composite calendar entries for other inherited composite calendars.

8. The method of claim 7 further comprising, receiving, by the computer, rules associated with defining the tracking of events occurring in the first and second calendaring systems using at least one of an application programming interface (API) and a protocol.

9. The method of claim 8 further comprising, receiving, by the computer, actions through the API that raise composite calendar events which are communicated to the first or second calendaring system using the meta schema.

10. The method of claim 8 wherein in receiving the rules, the API is accessed via the composite calendar system by interacting with a graphical user interface (GUI) application.

11. The method of claim 7 wherein in selecting, the first and second calendaring systems are associated with different entities.

12. The method of claim 7 further comprising using, by the computer, the meta schema for selectively synchronizing contact data or task data, associated with the first and second calendaring systems, as composite contact data or composite task data, which is accessible via the composite calendar system.

* * * * *

UNITED STATES PATENT AND TRADEMARK OFFICE
CERTIFICATE OF CORRECTION

PATENT NO. : 8,538,992 B1   Page 1 of 1
APPLICATION NO. : 10/612059
DATED : September 17, 2013
INVENTOR(S) : Lawyer et al.

It is certified that error appears in the above-identified patent and that said Letters Patent is hereby corrected as shown below:

In the Claims

In column 13, line 35, in Claim 1, after "product", delete "from that", therefor In column 14, line 53, in Claim 6, before "1", insert --claim--, therefor Signed and Sealed this
Nineteenth Day of November, 2013

Teresa Stanek Rea
*Deputy Director of the United States Patent and Trademark Office*